United States Patent [19]

Veenhof

[11] Patent Number: 4,498,577

[45] Date of Patent: Feb. 12, 1985

[54] SCRAPING DEVICES FOR CONVEYOR BELT AND PULLEY DRUM

[76] Inventor: Willem D. Veenhof, 705 Main St., Destin, Fla. 32541

[21] Appl. No.: 294,924

[22] Filed: Aug. 21, 1981

Related U.S. Application Data

[63] Continuation-in-part of Ser. No. 184,044, Sep. 4, 1980, Pat. No. 4,349,098.

[30] Foreign Application Priority Data

Sep. 7, 1979 [ZA] South Africa ..................... 79/4738
Sep. 5, 1980 [CA] Canada ................................. 359680
Sep. 5, 1980 [GB] United Kingdom ................ 8028685

[51] Int. Cl.³ ............................................ B65G 45/00
[52] U.S. Cl. .................................... 198/499; 15/256.5
[58] Field of Search .............. 198/497, 498, 499, 716, 198/827, 825, 924; 15/256.5

[56] References Cited

U.S. PATENT DOCUMENTS

| | | | |
|---|---|---|---|
| 2,227,776 | 7/1941 | Anderson | 198/229 |
| 2,586,538 | 12/1944 | Hapman | 198/716 |
| 2,878,926 | 6/1959 | Harty et al. | 198/230 |
| 3,047,133 | 7/1962 | Searles | 198/499 X |
| 3,430,758 | 3/1969 | Searles | 198/498 |
| 4,349,098 | 9/1982 | Veenhof | 198/499 X |

FOREIGN PATENT DOCUMENTS

| | | | |
|---|---|---|---|
| 801144 | 3/1950 | Fed. Rep. of Germany . | |
| 1216193 | 5/1966 | Fed. Rep. of Germany | 198/827 |
| 1575879 | 2/1969 | France . | |
| 707907 | 10/1954 | United Kingdom . | |
| 1331222 | 8/1973 | United Kingdom . | |
| 1433659 | 4/1976 | United Kingdom | 198/498 |
| 421572 | 1/1975 | U.S.S.R. | 198/827 |
| 481506 | 12/1975 | U.S.S.R. | 198/498 |
| 719940 | 9/1978 | U.S.S.R. | 198/498 |

Primary Examiner—Joseph E. Valenza
Assistant Examiner—Dennis Williamson
Attorney, Agent, or Firm—Glaser, Griggs & Schwartz

[57] ABSTRACT

A conveyor belt cleaning assembly including at least one generally transversely extending cleaning device, engaging, in an operative position, a conveyor belt surface to be cleaned. The cleaning device includes a plurality of wear resistant scraper discs supported by a flexible tension member and resilient spacer coils coupled between the tension member and scraper discs for compressively engaging and yieldably maintaining the scraper discs at separate scraper positions along the tension member.

16 Claims, 11 Drawing Figures

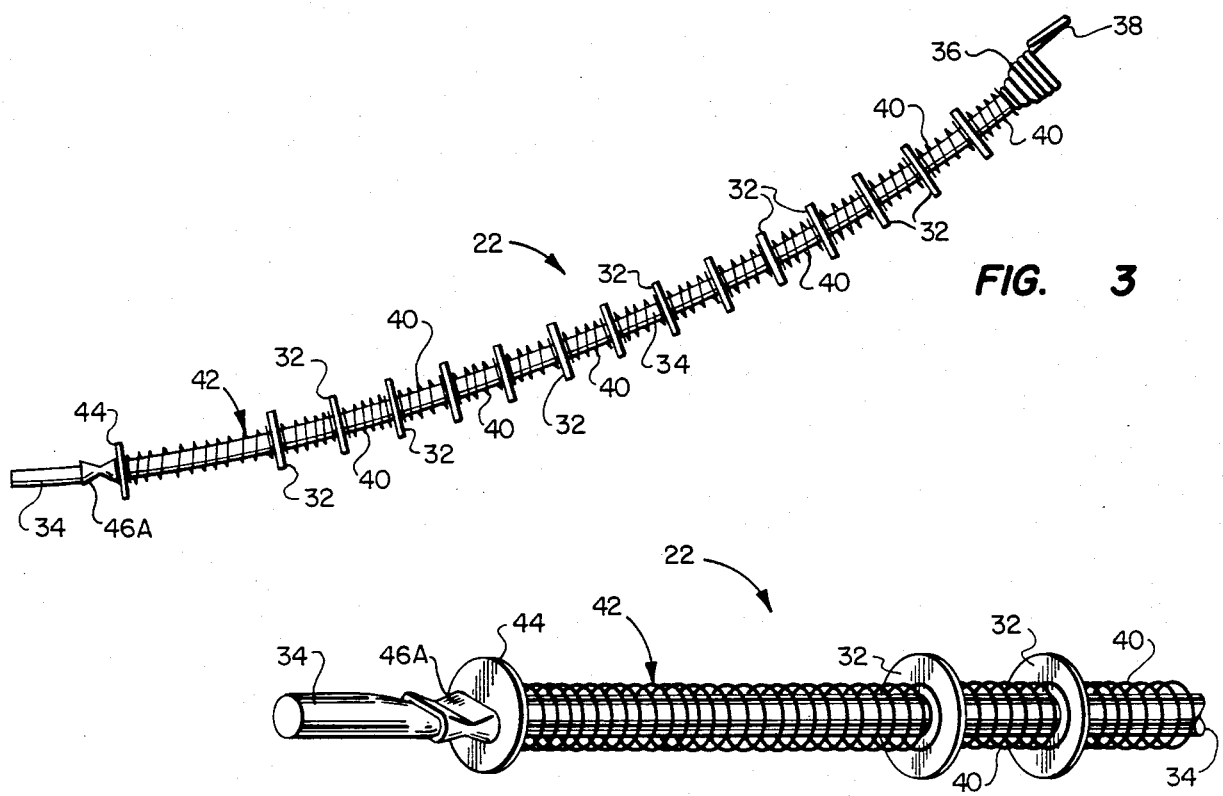
FIG. 3
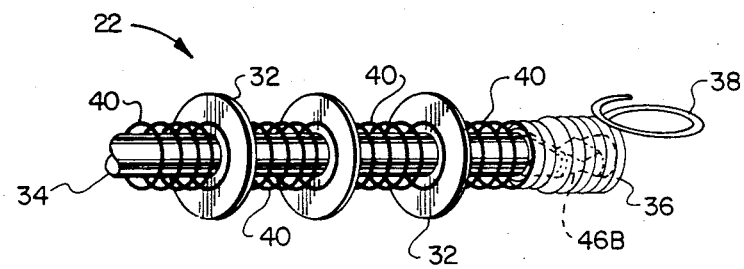
FIG. 4
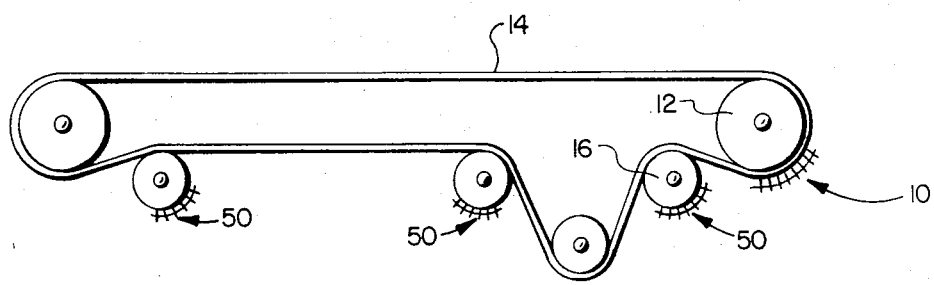
FIG. 5
FIG. 6

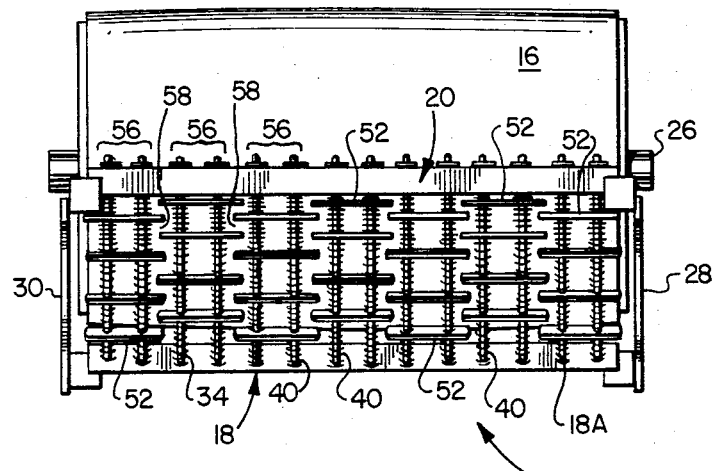
FIG. 7
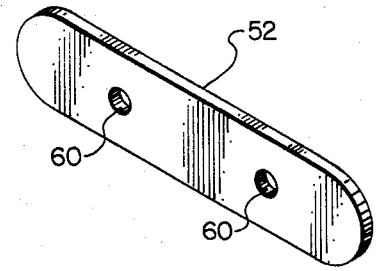
FIG. 7A
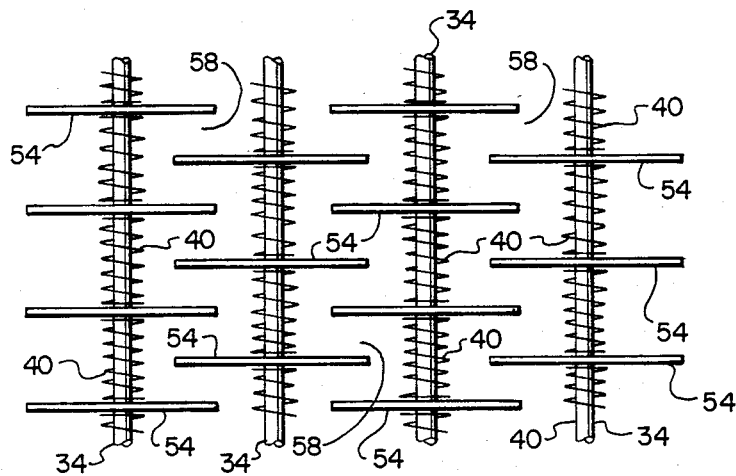
FIG. 8
FIG. 8A
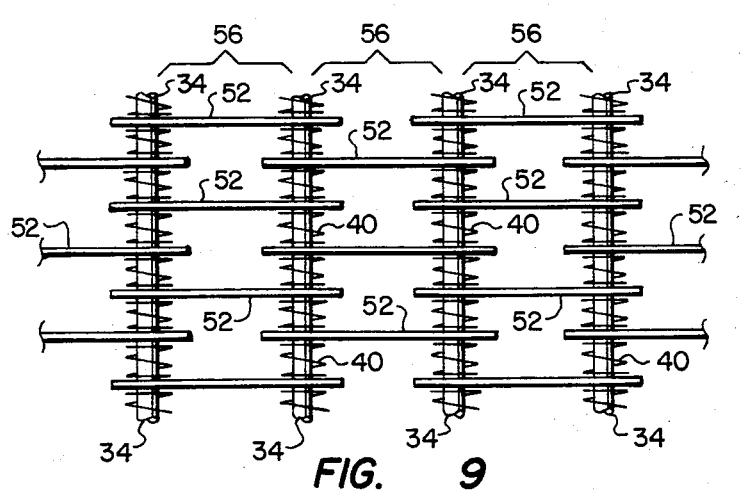
FIG. 9

SCRAPING DEVICES FOR CONVEYOR BELT AND PULLEY DRUM

This application is a continuation-in-part of Ser. No. 184,044 filed 9.4.80 now U.S. Pat. No. 4,349,098.

BRIEF DESCRIPTION OF THE INVENTION

1. Field of the Invention

This invention relates to cleaning or scraping devices utilized for removing material which adheres to a conveyor belt or pulley drum.

2. Description of the Prior Art

Conventional conveyor belt cleaning devices generally include one or more blades disposed in planes transverse to the conveyor belt and which are urged toward the belt so as to cause engagement of an edge of a blade with the belt surface. Such a conveyor belt cleaning device must be located rearwardly of the head pulley drum on the return path of the conveyor belt so that sufficient flexibility in the belt is provided to accept transverse movement thereof when, for example, protruding objects such as rivet fasteners connecting ends of belt lengths pass the cleaning device.

Such a location of the belt cleaning device is disadvantageous from a number of different points of view. First, materials scraped from the belt surface by means of the belt cleaning device cannot be discharged into a chute which is often provided at the head pulley drum end of the conveyor belt. Such chutes generally extend only partway beneath the head pulley drum. Added to this is the fact that in the desired cleaning zone, the belt tends to revert to an arched configuration soon after passing around the pulley drum so that it assumes the trough profile which characterizes the upper load bearing path of the conveyor belt. Also, the scraper blades are generally disposed substantially at right angles across the width of the belt which means that they can become damaged when snagged by a projecting fastener, belt puncture, or other surface irregularity.

One factor which has limited the effectiveness of the conventional scraper blade cleaner is the presence of shallow undulations extending longitudinally through the surface of the conveyor belt which cannot be cleaned effectively by the scraper blades. Moreover, the pulley drum is not a perfect cylinder, being somewhat oval in profile, so that a wide scraper blade cannot be used effectively in the curved region of the belt as it is guided around the pulley drum, and likewise cannot be used after it has passed around the pulley drum when it has assumed the trough profile.

In certain conveyor belt installations, snub pulleys and internal drive bend pulleys are exposed to the load bearing side of the conveyor belt. The build-up of load material onto the drum surface interferes with proper belt tracking. Thus, there exists a requirement for a cleaning device which is effective for removing deposited material from the drum surface.

OBJECTS OF THE INVENTION

It is the principal object of this invention to provide a conveyor belt cleaning device which, at least in some respect, overcomes one or more of the above-mentioned limitations of present conveyor belt cleaning devices.

Another object of this invention is to provide a device which is effective for cleaning the surface of a pulley drum.

SUMMARY OF THE INVENTION

In accordance with one aspect of the invention, there is provided a conveyor belt cleaning device including at least one generally transversely extending cleaning member, engaging, in the operative position, a conveyor belt surface to be cleaned, the cleaning member including an elongated flexible tension member, a series of wear resistant scraper elements movably mounted onto the tension member, and resilient spacer means coupled to the tension member and yieldably separating the scraper elements whereby the scraper elements are maintained perpendicular to the belt surface, but allowing the scraper elements to deflect to permit a surface irregularity such as a lacing, seam, or protruding mechanical fastener to pass without snagging and damaging the scraper assembly.

In accordance with a preferred embodiment of this invention, the flexible tension member is a solid polyurethane strand or stainless steel cable and each scraper element is a circular disc which is rotatable about the tension member. The scraper discs are yieldably separated by coil springs which encircle the tension member between adjacent discs. The end-to-end spacer coils and scraper discs are compressed together along the length of the tension member so that each scraper disc is compressively engaged between spacer coils, but with each scraper disc being slightly rotatable with respect to the tension member. Each disc is resiliently biased by the coil spacers for return to an upright perpendicular position after being deflected momentarily. According to this arrangement, each scraper disc rotates slightly in use, whereby the curved scraping edge wears evenly on each disc. Addtionally, the yieldable compression is balanced on each side of the disc so that it can deflect momentarily to allow a surface irregularity or belt protrusion to pass without becoming snagged and causing damage.

Further features of the invention provide for the cleaning assembly to be located beneath the overhang defined by a head pulley drum for yieldable, thrusting engagement with the curved surface of a conveyor belt passing around the drum, or for engagement with the drum surface itself. For small pulley diameters, the scraper elements are preferably oblong, with adjacent tension members being aligned and spaced laterally thereby allowing end portions of the oblong scraper elements to overlap laterally in the common space between adjacent tension members.

The oblong scraper elements are preferably maintained in a perpendicular orientation with respect to the drum surface, and parallel with the axis of rotation of the drum. Other scraper patterns which may be used to good advantage for cleaning the pulley drum surface include oblong scraper elements which link together adjacent pairs of tension members in parallel courses with adjacent scraper courses being aligned and spaced laterally thereby allowing end portions of the scrapers to overlap laterally in the common space between the courses. In yet another scraper pattern, adjacent tension members of neighboring scraper courses are interconnected by the oblong scraper members.

The elements essential to the successful practice of all aspects of the invention include an elongated flexible tension member, a plurality of wear resistant scraper elements supported by the tension member and resilient spacer means compressively engaging and yieldably separating the scraper elements.

DESCRIPTION OF THE DRAWINGS

In order that the invention may be more fully understood, multiple embodiments thereof will now be described with reference to the accompanying drawings in which:

FIG. 3 is a perspective view of a scraper device as used in the assembly of FIG. 1;

FIG. 4 is a perspective view of an end portion of the scraper device of FIG. 3;

FIG. 5 is a perspective view of the opposite end portion of the same device;

FIG. 6 is a simplified elevation view of a conveyor belt installation showing the various locations the scraper assembly may be used;

FIG. 7 is an elevation view illustrating an alternate form of a conveyor belt cleaning device in operation;

FIG. 7A is a perspective view of an oblong scraper element used in the assembly of FIG. 7;

FIG. 8 is a partial plan view which illustrates yet another scraper pattern;

FIG. 8A is a perspective view of an oblong scraper element of the type used in the assembly of FIG. 8; and, FIG. 9 is a partial plan view of yet another scraper pattern.

DESCRIPTION OF THE PREFERRED EMBODIMENTS

Figure 1:
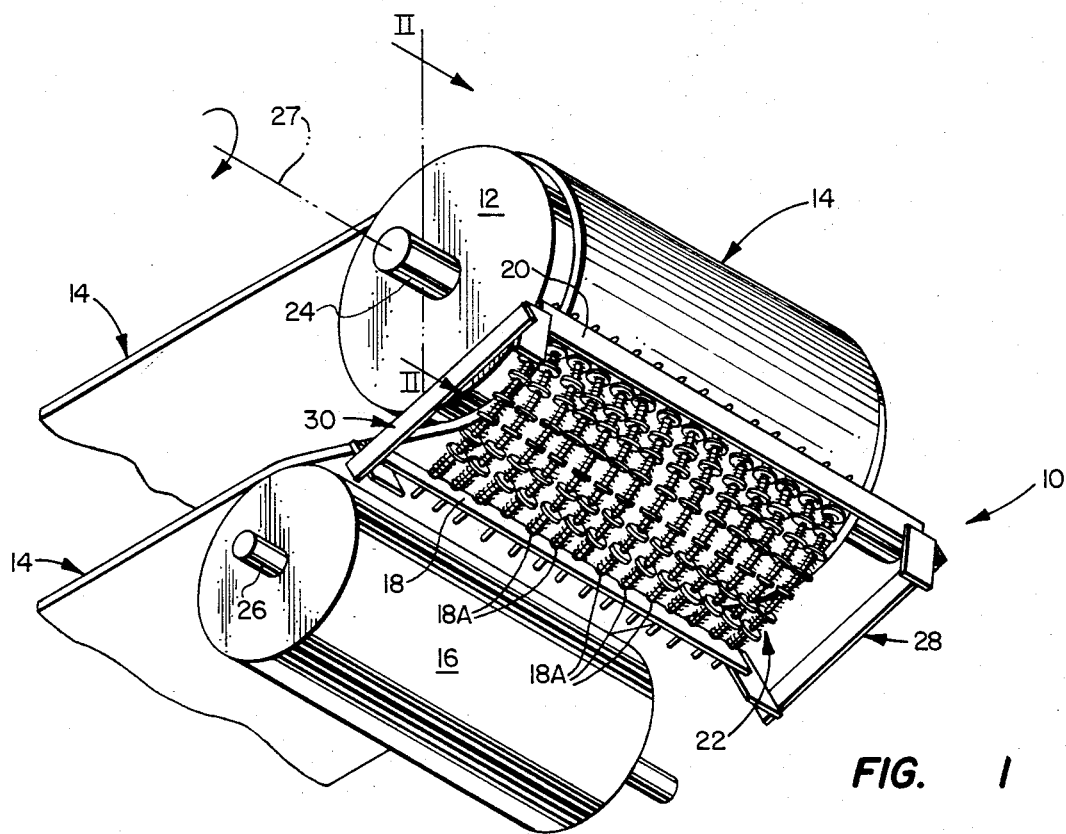
FIG. 1 is a perspective underneath view of a head pulley drum of a conveyor belt assembly, illustrating one form of conveyor belt cleaning device in operation.

In the description which follows, like parts are marked throughout the specification and drawings with the same reference numerals, respectively. The drawings are not necessarily to scale and in some instances portions have been exaggerated in order to more clearly depict certain features of the invention.

Figure 2:
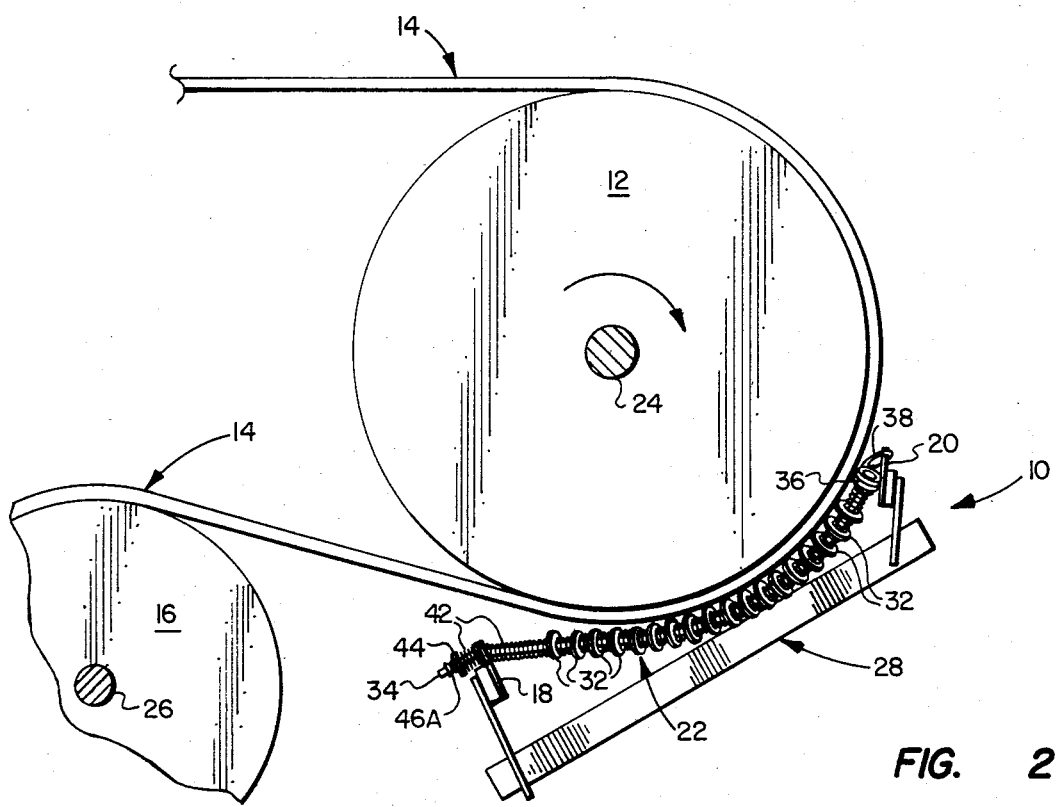
FIG. 2 is a side elevation view of the same conveyor belt cleaning device.

Referring now to FIGS. 1 and 2 of the accompanying drawings, a conveyor belt cleaning assembly generally indicated by the numeral 10 is located beneath the overhang of a head pulley 12 supporting a conveyor belt 14 passing therearound. The conveyor belt 14 is an endless flexible belt, operating over drive, tailend and bend pulleys 16, and over belt idlers or a slider bed. The conveyor belt 14 is suitable for handling many materials and a wide range of particle sizes over long distances, up and down slopes.

For simplicity of illustration, the supporting framework and structure have been omitted from the accompanying sketches so that no support means are illustrated for two parallel, transversely extending bars 18 and 20 which form the main supports for an array of belt cleaning devices 22 in the cleaning assembly 10. It will be understood that the head pulley drum 12 and bend pulley 16 are mounted on shafts 24, 26, respectively, which are supported at opposite ends for rotation on bearings in the usual manner.

The uppermost transverse bar 20 is located inwardly of the overhang portion of the head pulley drum so that conveyed material, in particular lumps thereof, will not become wedged between the belt surface and the bar 20. The lower support bar 18 is located substantially beneath the axis 27 of rotation of the head pulley drum 12 and a small distance away from the belt surface itself. The support bars 18, 20 are stabilized at each end by braces 28, 30.

The line between the two support bars 18, 20 intersects the arcuate surface of the conveyor belt 14 and thus a flexible conveyor belt cleaning member is required. Flexibility is provided by an articulated, flexible cleaning device 22 composed of a series of scraper elements 32 of a wear resistant material such as tungsten carbide or hard steel alloys movably threaded onto a high strength flexible tension member 34. The tension member 34 is preferably a single strand of polyurethane. However, other high strength, flexible materials such as stainless steel cable or a synthetic polymer material such as polyurethane or a polymer material such as sold by DuPont Corporation under the trademark Nylon, either stranded or solid, may be used to good advantage.

The flexible cleaning device 22 includes at least one anchor spring 36 connected in its length with a hook fastener 38 as can best be seen in FIG. 5. Each scraper disc 32 is snugly fitted about the tension member 34, but is slightly rotatable about the tension member. When in use, the rubbing action against the disc causes it to rotate, thereby ensuring even wear. Moreover, each disc is movable with respect to the tension member so that it will deflect or twist and give way to a surface irregularity without snagging and causing damage.

According to a preferred feature of the invention, the scraper elements 32 are separated by resilient spacer elements 40, preferably in the form of a stainless steel coil spring. The flexible tension member 34 is threaded through each scraper disc 32 and through each scraper coil 40, with the spacer coil 40 at the extreme right end of the tension member being jammed against the anchor spring 36. The anchor spring 36 is retained onto the polyurethane tension member 34, preferably by a crimp band 46B (FIG. 5). The scraper discs 32 and spacer coils 40 are continuously compressed against each other in response to the force developed by a setting spring 42 disposed around the opposite end of the tension member, as can best be seen in FIGS. 3 and 4.

The desired amount of compression force is developed by compressing the setting spring 42, spacer coils 40 and scraper discs 32 between clamp bands 46A, 46B (FIGS. 4 and 5). A terminal disc 44 is disposed between the setting spring 42 and the clamp band 46A. The clamp band 46B serves as a retainer for the anchor spring 36. Each clamp band is disposed in crimped engagement with the tension member 34 at opposite ends, respectively. According to this arrangement, the scraper discs 32 and compression coils 40 undergo compressive loading at all times, whereby the scraper discs 32 automatically return to the upright scraping position relative to the conveyor belt after being deflected by a conveyor belt surface irregularity such as a protruding fastener.

Any suitable number of conveyor belt cleaning devices 22, as just described, may be provided to extend across the entire width of a conveyor belt. In this particular embodiment of the invention, there are illustrated fourteen such members, but it will be appreciated that fewer or more such devices, as desired, may be utilized to good advantage, with the scraper element diameter and transverse angle being adjusted to ensure complete surface coverage, according to conveyor belt width.

In the illustrated embodiment of the invention, each of the conveyor belt cleaning devices 22 has one end of the cable 34 secured to the upper transverse support bar 20. The cleaning member 20 is held in contact with the belt surface by the cable 34 which is attached, at its other end, to the lower transverse support bar 18 at a position laterally spaced relative to the point of attachment to the upper support bar 18. Thus, each of the conveyor belt cleaning devices 22 will follow a substantially helical path akin to a multistart thread of great pitch.

It will be understood that as a result of the spring 36 and the flexible nature of the tension member 34, each of the above-described conveyor belt cleaning devices 22 will be held in yieldable thrusting engagement with the surface of the conveyor belt apart from its leading and trailing end regions. The fourteen conveyor belt cleaning members 22, illustrated in this particular embodiment of the invention, are arranged such that they overlap in their operative positions and thereby clean the entire width of the conveyor belt apart, possibly, from the absolute edge regions thereof.

The upper end of the cleaning device 22 is coupled to the upper support bar 20 by means of the hook attachment portion 38 of the anchor spring 36. The lower end, however, is adjustably coupled to the lower support bar 18 in a notched opening 18A in the lower support bar which forms a yoke (FIG. 2). To establish the desired amount of tension in the scraper device, the upper end is fastened through a hooking eye in the upper support bar 20, with the lower end being pulled for a predetermined extension of the anchor spring 36. When the desired tension level is reached as the anchor spring is extended, the lower compression setting spring 42 and cable 34 are inserted into the notch 18A, thereby anchoring the lower end in place with the desired amount of tension established in the scraper cable. The compression setting spring 42 thus maintains the scraper discs 32 under compression while also serving as an adjustable fastener means for conveniently attaching the lower end of the cleaning device and at the same time establishing a desired amount of tension in the cable.

Inasmuch as the shape and design of the scraper elements 32 and of the spacer elements 40 themselves may be varied substantially, the above-described disc construction is not intended to be limiting on the scope of this invention. For example, the scraper elements 32 may be oval or oblong, and the spacer elements 40 may be a tube of resilient material such as natural or synthetic rubber.

Additionally, the same result can be obtained by using an elastic tension member 34 with rigid spacers 40. In this form, a rubber tension cord with short pieces of non-compressible tubing (e.g. polyethylene) as spacers could be used.

The cleaning assembly 10 is intended to be located beneath the overhang defined by a head pulley drum, as illustrated in FIG. 6, for yieldable, thrusting engagement with the curved surface of the conveyor belt 14 as it passes around the head pulley drum. In those installations utilizing a snub pulley or internal drive bend pulley 16, the surface of the pulley drum is exposed to the load bearing side of the conveyor belt. The build-up of load material on the drum surface interferes with proper belt tracking. Accordingly, a pulley drum cleaning assembly 50 is installed in the overhang region beneath the drum in yieldable engagement directly onto the drum surface to remove deposited material (FIG. 6). In the scraper pattern illustrated in FIG. 7, the oblong scraper elements 52 are oriented substantially perpendicular to the surface of the drum, with the scraper edge being oriented substantially parallel with the rotational axis of the drum. Thus, in the arrangement shown in FIG. 7, the oblong scraper elements 52 engage the drum in a "head-on" orientation, as compared with the transverse orientation of the circular disc scraper elements 32.

In the arrangement shown in FIG. 7, the elongated tension members 34 are linked together by the oblong scraper elements 52 thereby defining parallel scraper courses 56 which are mutually aligned and spaced laterally thereby allowing end portions of the scraper elements 52 to overlap laterally in the common space 58 between adjacent pairs of courses 56. In this arrangement, each oblong scraper element 52 is provided with a pair of openings 60 through which adjacent tension members 34 in each course extend. The oblong scraper elements 52 are yieldably separated by the coil springs 40 which encircle each tension member 34 between adjacent scraper members. The end-to-end spacer coils 40 and scraper elements 52 are compressed together along the length of each tension member so that each scraper element is compressively engaged beneath the spacer coils, with each scraper element being angularly deflectable with respect to the tension member to accommodate a surface irregularity.

Another scraper pattern which may be used to good advantage for cleaning the pulley drum surface is illustrated in FIG. 8. In this arrangement, oblong scraper elements 54 having a single opening 60 are threaded onto each tension member 34 in spaced relation, with adjacent tension members being aligned and spaced laterally thereby allowing end portions of the oblong scraper elements to overlap laterally in the common space 58 between adjacent tension members. The scraper elements 54 are resiliently biased by coil springs 40 as in the foregoing scraper arrays. In the pattern of FIG. 8, the oblong scraper elements are capable of greater rotational movement with respect to the tension member 34 as compared with the scraper elements 52 in the pattern shown in FIG. 7.

In yet another scraper arrangement, as illustrated in FIG. 9, adjacent tension members 34 of neighboring scraper courses 56 are interconnected by the oblong scraper elements 52.

Although preferred embodiments of the invention have been described in detail, it should be understood that various changes, substitutions and alterations can be made therein without departing from the spirit and scope of the invention as defined by the appended claims.

What is claimed is:

1. A conveyor belt cleaning device comprising, in combination:
    an array of scraper rings, each scraper ring having a central aperture;
    resilient spacer coils separating said scraper rings; and,
    a flexible strand threaded through the apertures of said scraper rings and spacer coils, said scraper rings and spacer coils being movable along said flexible strands.

2. The conveyor belt cleaning device as defined in claim 1, including:
    means coupled against said flexible strand and said spacer coils for maintaining said spacer coils in yieldable, compressive engagement with said scraper rings.

3. The conveyor belt cleaning device as defined in claim 2, said means comprising first and second clamp bands each disposed in crimped engagement with said flexible strand at opposite ends thereof, with said scraper discs and spacer coils being confined between said clamp bands.

4. A conveyor belt cleaning device comprising, in combination:
an elongated flexible tension member;
a plurality of wear resistant scraper elements movably mounted onto said tension member; and,
resilient spacer means movably coupled to said tension member and yieldably separating said scraper elements.

5. A conveyor belt cleaning device comprising, in combination:
an elongated flexible tension member;
a plurality of wear resistant scraper elements movably coupled to said tension member; and,
spacer means movably coupled to said tension member, said spacer means compressively engaging and yieldably separating said scraper elements.

6. A cleaning device for conveyor belts and the like comprising a flexible tension member, a plurality of wear resistant scraper elements movably supported on said tension member, and means movably coupled between said tension member and said scraper elements for yieldably maintaining said scraper elements at separate scraper positions along said tension member.

7. The cleaning device as defined in claim 6, said scraper elements each comprising a circular disc.

8. In a conveyor belt assembly of the type having an endless conveyor belt driven by a head pulley drum, the improvement comprising a conveyor belt cleaning device mounted beneath the overhang defined by the head pulley drum, sand engaging the curved surface of the conveyor belt in the overhang region where the conveyor belt is in contact with the head pulley drum, said belt cleaning device including an elongated flexible tension member, a plurality of wear resistant scraper elements movably assembled onto said tension member, resilient spacer means movably coupled to said tension member and yieldably separating said scraper elements, and bias means coupled to said tension member for maintaining the scraper elements in yieldable engagement with the curved surface of the conveyor belt.

9. A conveyor belt cleaning assembly adapted to be located beneath the overhang defined by a head pulley drum, including a plurality of conveyor belt cleaning members adapted to be extended in similar paths relative to the conveyor belt such that each follows the path of a multistart thread of extremely large pitch, each of the conveyor belt cleaning members including a series of abrasion resistant scraper elements movably threaded onto a flexible strand, said strand being held in tension by means of a spring connected to one end of said strand, and resilient spacer coils movably threaded onto said strand and yieldably separating said scraper elements.

10. The belt cleaning assembly as defined in claim 8, including lower and upper support bars, and wherein the cleaning members are supported between the lower and upper support bars, and the spring is a tension spring connected between each flexible strand and one of the support bars.

11. A conveyor belt cleaning device for cleaning a conveyor belt in a region where the conveyor belt is in contact with a head pulley drum, comprising at least one cleaning member extending transversely relative to the conveyor belt but in generally helical direction relative to the head pulley drum, the conveyor belt cleaning member being resiliently biased for yieldable engagement with the curved surface of the conveyor belt and movable in a direction away from the conveyor belt surface in a region where the belt is in contact with the head pulley drum, the conveyor belt cleaning member including an elongated flexible tension member, a plurality of wear resistant scraper elements movably assembled onto said tension member, resilient spacer means movably coupled to said tension member and separating said scraper elements, and means coupled between said tension member and spacer means for maintaining said spacer means in yieldable, compressive engagement with said scraper elements.

12. Apparatus for cleaning a head pulley drum or conveyor belt adapted to be mounted between first and second support bars beneath the overhang defined by the head pulley drum comprising, in combination:
an array of elongated flexible tension members, each having end portions adapted for attachment to the first and second support bars, respectively;
a plurality of wear resistant scraper elements movably coupled to each tension member; and,
resilient spacer means movably coupled to each tension member and yieldably separating said scraper elements.

13. Cleaning apparatus as defined in claim 12, each scraper element comprising a circular disc.

14. Cleaning apparatus as defined in claim 12,
said scraper elements each being oblong with a central opening through which a tension member extends; and,
adjacent tension members being aligned and spaced laterally thereby allowing end portions of said scraper elements to overlap laterally in the common space between tension members.

15. Apparatus for cleaning a head pulley drum or conveyor belt adapted to be mounted between first and second support bars beneath the overhang defined by the head pulley drum comprising, in combination:
an array of elongated flexible tension members, each having end portions adapted for attachment to the first and second support bars, respectively;
a plurality of wear resistant scraper elements movably coupled to each tension member;
resilient spacer means coupled to each tension member and yieldably separating said scraper elements,
said scraper elements each being oblong with first and second openings through which adjacent pairs of tension members extend thereby defining a scraper course; and,
adjacent scraper courses being aligned and spaced laterally thereby allowing end portions of said scrapers to overlap laterally in the common space between courses.

16. Apparatus for cleaning a head pulley drum or conveyor belt adapted to be mounted between first and second support bars beneath the overhang defined by the head pulley drum comprising, in combination:
an array of elongated flexible tension members, each having end portions adapted for attachment to the first and second support bar, respectively;
a plurality of wear resistant scraper elements movably coupled to each tension member;
resilient spacer means coupled to each tension member and yieldably separating said scraper elements;
said scraper elements each being oblong with first and second openings through which adjacent pairs of tension members extend thereby defining a scraper course; and,
adjacent tension members of neighboring scraper courses being interconnected by said scraper elements.

* * * * *